United States Patent
Kobrehel et al.

[11] Patent Number: 6,141,910
[45] Date of Patent: *Nov. 7, 2000

[54] DOOR MODULE HAVING A WINDOWPANE WHICH INCLUDES BRACKETS FOR ATTACHING THE WINDOWPANE TO THE DOOR MODULE AND FOR MOVING THE WINDOWPANE

[75] Inventors: Michael Kobrehel, Elkhart; Bruce Bostian, Bristol, both of Ind.; Darren Grumm, Cassopolis, Mich.

[73] Assignee: Dura Global Technologies, Inc., Rochester Hills, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/864,391

[22] Filed: May 28, 1997

[51] Int. Cl.[7] .............. B60J 1/16; E05F 11/38; E05F 11/48
[52] U.S. Cl. ................ 49/378; 49/372; 49/374; 49/348; 49/352
[58] Field of Search ............... 49/372, 374, 378, 49/348, 349, 352, 502

[56] References Cited

U.S. PATENT DOCUMENTS

| | | | |
|---|---|---|---|
| 3,831,320 | 8/1974 | Dauernheim et al. | 49/352 |
| 3,890,743 | 6/1975 | Eckhardt et al. | 49/352 |
| 4,110,935 | 9/1978 | Sessa | 49/352 |
| 4,240,227 | 12/1980 | Hasler et al. | 49/348 |
| 4,593,494 | 6/1986 | Ono et al. | 49/374 |
| 4,604,830 | 8/1986 | Maeda et al. | 49/374 |
| 4,608,779 | 9/1986 | Maeda et al. | |
| 4,727,681 | 3/1988 | Kinoshita et al. | 49/352 |
| 4,823,511 | 4/1989 | Herliczek et al. | 49/374 X |
| 4,845,894 | 7/1989 | Herringshaw et al. | |
| 4,874,201 | 10/1989 | Scaglietti | 49/374 X |
| 4,875,307 | 10/1989 | Barbero | 49/374 |
| 4,890,376 | 1/1990 | Boileau | |
| 4,924,630 | 5/1990 | Lomasney et al. | |
| 4,932,161 | 6/1990 | Keys et al. | 49/374 X |
| 4,970,828 | 11/1990 | Mesnel et al. | 493/74 |
| 4,984,389 | 1/1991 | Benoit et al. | |
| 5,001,867 | 3/1991 | Dupuy | 49/502 |
| 5,018,303 | 5/1991 | Koura et al. | |
| 5,033,236 | 7/1991 | Szerdahelyi et al. | |
| 5,040,333 | 8/1991 | Mesnel et al. | 49/374 |
| 5,054,242 | 10/1991 | Keys et al. | 49/374 X |
| 5,070,648 | 12/1991 | Moriyama | 49/352 |
| 5,074,077 | 12/1991 | Toyoshima et al. | 49/352 |
| 5,086,589 | 2/1992 | dibenedetto | |
| 5,090,158 | 2/1992 | Bertolini | |
| 5,107,624 | 4/1992 | Passone | |
| 5,111,620 | 5/1992 | Lau et al. | |
| 5,251,403 | 10/1993 | Compeau et al. | |

(List continued on next page.)

*Primary Examiner*—Daniel P. Stodola
*Assistant Examiner*—Gregory J. Strimbu
*Attorney, Agent, or Firm*—Banner & Witcoff, Ltd.

[57] ABSTRACT

A motor vehicle door module, built as a preassembled unit, includes a windowpane movable between open and closed positions, an integrated window regulator assembly including a drive mechanism such as a drive motor or hand crank for moving the windowpane between the open and closed positions, a cable assembly, cable routers such as pulleys or sliders, a seal assembly, and a door frame assembly including run channels. The windowpane includes a bracket assembly which is slidably disposed within the run channels. The cable assembly includes a cable connected to the bracket assembly and the drive mechanism for transferring a force of the drive mechanism to the bracket assembly to move the windowpane between the open and closed positions. The cable routers are attached to fore and aft door frames of the door frame assembly and route the cable between the drive mechanism and the bracket assembly. The seal assembly forms a seal between the windowpane and the door frames and between the windowpane and the motor vehicle body. The windowpane may be positioned so that in the closed position, the windowpane is generally flush with an exterior surface of the motor vehicle body. The brackets of the bracket assembly and the run channels may be T, U, J and I shaped in cross section. The cable can be attached to the bracket assembly by a snap fit carrier.

26 Claims, 8 Drawing Sheets

U.S. PATENT DOCUMENTS

| | | |
|---|---|---|
| 5,308,138 | 5/1994 | Hlavaty . |
| 5,351,443 | 10/1994 | Kimura et al. ............................ 49/502 |
| 5,367,832 | 11/1994 | Compeau et al. . |
| 5,408,785 | 4/1995 | Heim et al. . |
| 5,425,206 | 6/1995 | Compeau et al. . |
| 5,430,977 | 7/1995 | Kitayama et al. . |
| 5,469,663 | 11/1995 | TenBrink et al. . |
| 5,495,693 | 3/1996 | Tiesler . |
| 5,505,024 | 4/1996 | DeRees et al. . |
| 5,529,370 | 6/1996 | Veit . |
| 5,535,553 | 7/1996 | Staser et al. . |
| 5,548,930 | 8/1996 | Morando . |
| 5,555,677 | 9/1996 | DeRees et al. . |
| 5,613,325 | 3/1997 | Mariel .................................. 49/374 X |
| 5,694,717 | 12/1997 | Gier ......................................... 49/352 |

DOOR MODULE HAVING A WINDOWPANE WHICH INCLUDES BRACKETS FOR ATTACHING THE WINDOWPANE TO THE DOOR MODULE AND FOR MOVING THE WINDOWPANE

FIELD OF THE INVENTION

The present invention generally relates to an improved window regulator assembly for integration into a door module, and more particularly to integration of such door modules into motor vehicle doors.

BACKGROUND OF THE INVENTION

Conventional window regulators used in motor vehicle doors for raising and lowering windowpanes are often of the so-called cable- drum variety. Cable-drum window regulators typically have a cable connecting drive means such as a drive motor to a glider. The glider is connected to the windowpane via an attachment bracket and is slidable over a rail or channel. The rail is typically mounted in an inside cavity of the motor vehicle door so that it is not visible from outside the door. Operation of the motor turns the cable which in turn pulls the glider over the rail to guide the windowpane assembly between a closed position where the windowpane closes an opening and an open position where the windowpane moves at least partially into the cavity in the motor vehicle door. Glass run channels on either side of the windowpane and a header provide a sealing structure for the windowpane. For proper functioning of the window regulator, the rail must be aligned with the run channels; otherwise the run channels may not properly control the windowpane and/or there could be unacceptably high efforts to move the windowpane, and even jamming if the run channels and the rail are sufficiently misaligned. It would be desirable to eliminate the rail from a cable-drum window regulator and yet still provide proper windowpane guidance, stability and control.

Traditionally, window regulators have been assembled separate from the rest of the door, and are only attached to the windowpane and installed into the door at final assembly. However, this can involve awkward assembly processes, as the regulator often needs to be installed through a relatively small opening in an inner panel of the door. Recently simple door cassettes have been developed, wherein typically mechanisms for mounting the glass are affixed to a small plate. Other mechanisms may also be assembled together with the plate as a unit prior to installation into the motor vehicle. However, since the windowpane is not attached to this cassette until original equipment manufacturer (OEM) final assembly, critical functions of these devices, including windowpane cycling, cannot be adequately tested as a stand alone unit separate from the motor vehicle. It would be desirable to produce a window regulator designed for such a door module having enhanced assembly characteristics where a pre-assembled modular unit can be tested and adjusted prior to final assembly.

In addition, it would be desirable to develop a door module of low cost and relatively simply assembly having a three-sided flush exterior appearance, that is, a door module having a windowpane with an exterior surface, where fore, aft and top edges of the exterior surface of the windowpane are generally aligned with an exterior surface of the motor vehicle.

In view of the foregoing, it is an object of the present invention, at least in preferred embodiments, to provide a door module with an integrated window regulator having reduced cost and complexity while enhancing manufacturability.

It is an additional object of the present invention to provide a door module having a window regulator controlling a windowpane which is positioned flush with the exterior surface of the motor vehicle on at least three sides.

It is yet another related object of the present invention to provide such a door module that is highly reliable in operation.

SUMMARY OF THE INVENTION

In accordance with these and other objects, there is provided a door module for a door of a motor vehicle incorporating a window regulator for controlling the position of a windowpane, comprising drive means such as a drive motor for moving the windowpane between open and closed positions, wherein the windowpane closes an opening in the closed position, a bracket assembly fixedly attached to the windowpane, a cable assembly connecting the drive means to the bracket assembly, cable routing means such as pulleys or sliders for routing the cable assembly between the motor and the windowpane and a door frame assembly wherein the cable routing means are attached to the door frame assembly, and a seal assembly forming a seal between the door frame assembly and the windowpane. Advantageously, fore and aft door frames act to guide the windowpane, thereby eliminating the need for one or more centrally positioned rails, lowering costs and freeing valuable space in the center of a motor vehicle door for other components.

The door frame assembly, comprising at least a pair of door frames, one positioned on either side of the windowpane, preferably is a structural member. As structural members the door frames have numerous advantages over rails, such as allowing transmission of loading through the entire vehicle. Moreover, the door frames have a flange for receiving the cable routing means and define a run channel which provides guidance to the windowpane in fore-aft and inboard-outboard directions. The seal assembly can be positioned in each door frame so as to form a seal between the door frames and the motor vehicle and between the door frames and the windowpane. The structural door frame assembly can also provide enhanced aesthetics and styling options for motor vehicles.

The regulator can be built as part of a pre-assembled door or door module wherein a bracket assembly comprising fore and aft brackets are attached to corresponding fore and aft edges of the windowpane. Run channels of the door frame assembly slidably receive the brackets, thereby allowing the windowpane/brackets to act as a gliding element. Numerous bracket assembly and corresponding door frame assemblies can be used within the scope of the invention. In certain preferred embodiments the mounting brackets may be attached to one side of the windowpane, allowing for a flush unit, that is, one where an exterior surface of at least part of the windowpane is positioned generally in the same plane as an exterior surface of the motor vehicle.

From the foregoing disclosure and the following more detailed description of various preferred embodiments it will be apparent to those skilled in the art that the present invention provides a significant advance in the technology and art of window regulators and door modules. Particularly significant in this regard is the potential the invention affords for reduction of parts while maintaining strength in motor vehicle doors and guidance for motor vehicle windowpanes. Additional features and advantages of various preferred embodiments will be better understood in view of the detailed description provided below.

Figure 1:
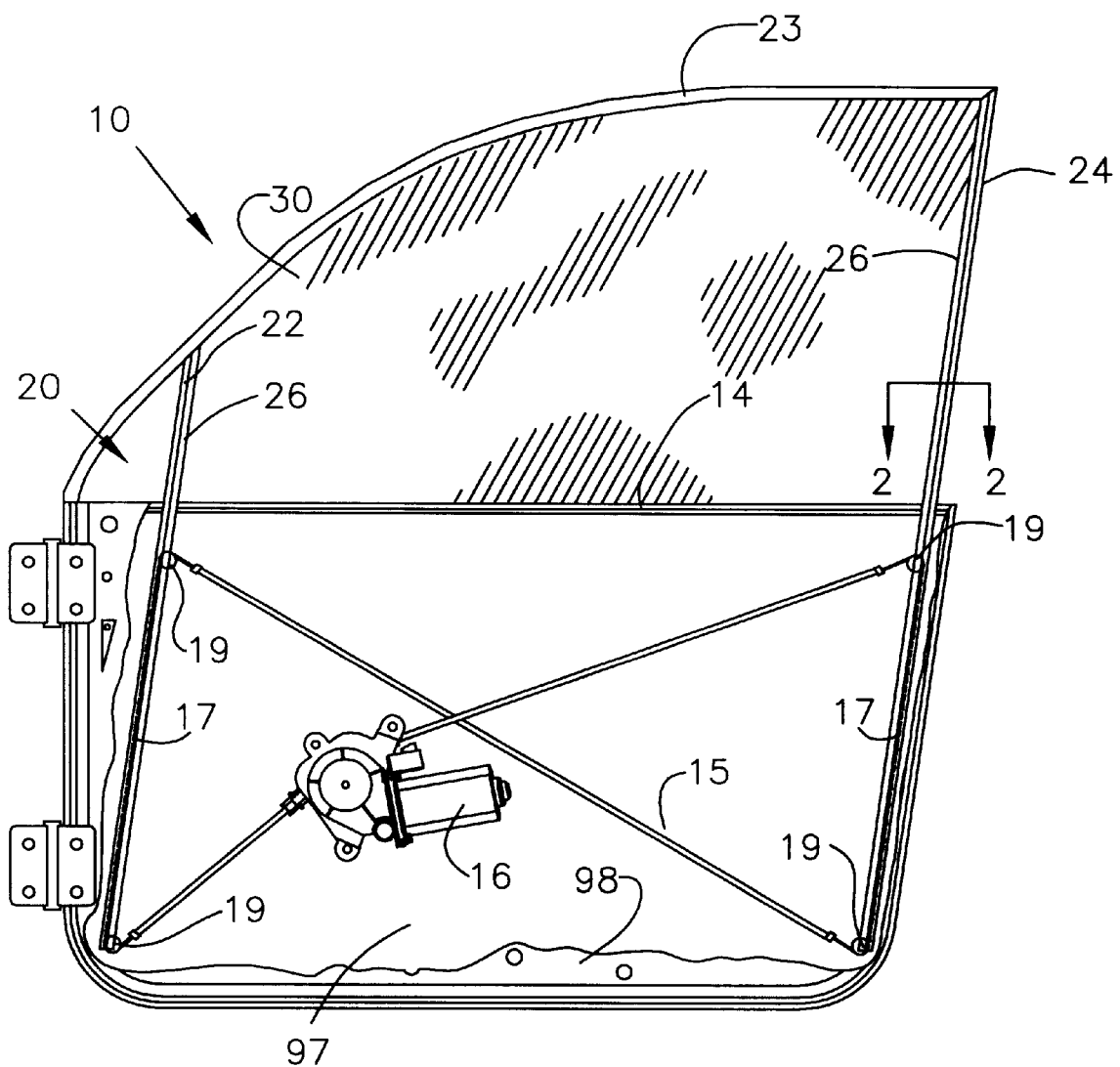
FIG. 1 is an inboard side elevation view of a preferred embodiment of a door module with an integrated window regulator.

It should be understood that the appended drawings are not necessarily to scale, presenting a somewhat simplified representation of various preferred features illustrative of the basic principles of the invention. The specific design features of a door module with an integrated window regulator as disclosed here, including, for example, the cross sectional thickness of the mounting brackets and the window frame assembly, and the specific dimensions of the cable ball carrier will be determined in part by the particular intended application and use environment. Certain features of the illustrated embodiments have been enlarged or distorted relative to others to facilitate visualization and clear understanding. In particular, thin features may be thickened, for clarity of illustration. All references to direction and position, unless otherwise indicated, refer to the orientation of the door module illustrated in the drawings. In general, fore and aft refers to the leftward and rightward direction in the plane of the paper in the side view of FIG. 1, inboard-outboard refers to a plane normal to the plane of the paper in FIG. 1, and up, down or vertical refers to corresponding up, down and vertical directions in the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the door modules with integrated window regulators disclosed herein. The following detailed discussion of various alternative and preferred features and embodiments will illustrate the general principles of the invention with reference to a window regulator integrated into a door module for a motor vehicle door, especially a cable-drum window regulator, although the principles of the invention will be applicable to other doors and other window regulators having an adjustable windowpane installed therein.

Referring now to the drawings, FIG. 1 shows an inboard side elevation view of a door module 20 with an integrated window regulator in a motor vehicle door 10 in accordance with a preferred embodiment. Since it is often desirable to paint both the exterior surface of the motor vehicle body 100 and the outer panel of the door at the same time to ensure continuity of color, surface gloss, etc., the door module 20 may, for example, comprise all elements of a motor vehicle door, except for the outer panel 97. In FIG. 1, an inner panel 98 is attached to outer panel 97 of motor vehicle door 10. The door frame assembly is shown to comprise first door frame 22, second door frame 24, and third door frame or header 23, which extends across the top of the door and connects the first door frame 22 to the second door frame 24. Preferably the fore and aft door frames are unitary elongate frame members extending from below the beltline to above the beltline which define run channels. Where the door frame assembly is part of the door module and built as a pre-assembled unit, it may be preferable to have the exterior or visible surfaces of the door frame assembly painted black or covered by a black seal or chrome.

Windowpane 30 is movable between a closed position as shown in FIG. 1, in which it closes the opening 99 formed between the midpoint or beltline 14 and the structural door frame assembly, 22,23,24, and an open position in which the windowpane moves through a windowpane receiving entrance into the inside cavity or well. Inner panel 98 in FIG. 1 is largely cut away for clarity of illustration. Motion of the windowpane is controlled by drive means, such as a motor 16 or hand crank attached to the inner panel 98. The motor pulls on the cables 17 routed through cable routing means such as pulleys 19 and connected to the windowpane via brackets 40, discussed in greater detail below. Optionally a protective conduit 15 may shield the cables over at least part of their length from dirt and other foreign matter. Preferably the windowpane is attached as part of the door module prior to final installation into a motor vehicle, allowing for cycle testing as a pre-assembled unit.

The door or the door module may have hinges to attach to the motor vehicle body, locking mechanisms, rearview mirrors, armrest instrument controls or other functional attachments included. Other door and door module functional attachments will be apparent to those skilled in the art given the benefit of this disclosure.

In a highly advantageous feature, door frames 22 and 24 act as both structural members and as mounting members for cable routing means such as sliders or the pulleys 19 disclosed in FIG. 1, thereby simplifying assembly by eliminating the need for a guide rail or rails for guiding a gliding element. The drive means pulls on the cable, which in turn pulls on the brackets, which slide in the run channels of the fore and aft door frames to move the windowpane to the desired location. In the embodiments shown in the drawings, a pair of pulleys are mounted on a cable routing flange 26 extending from each door frame, with one of the pulleys mounted on the flange just below the beltline 14 on each door frame. Preferably the cables cross so as to form an X-shape, although other cable configurations will be apparent to those skilled in the art given the benefit of this disclosure. Structural here means that the door frame members preferably are integrated with any other structural elements of the door to contribute substantial overall rigidity for preventing excessive deflection of the door in the course of normal vehicle operation (e.g., deflection to such an extent that audible wind noise occurs between the door frame and the windowpane or that permanent bending occurs). This is important since excessive deflection can result in improper sealing, squeaks, rattles and buzzes, and potentially water entry.

Figure 2:
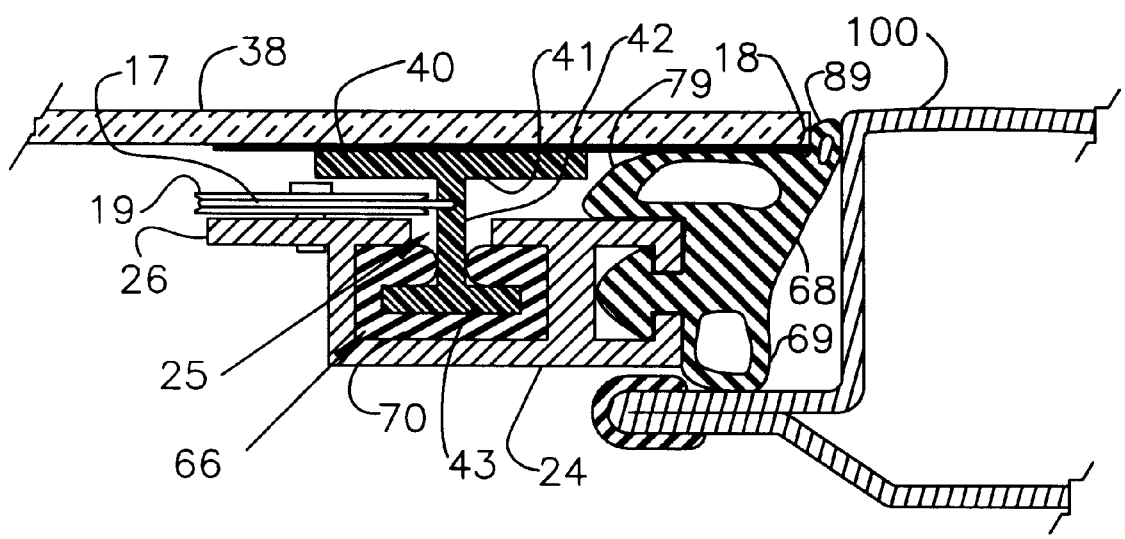
FIG. 2 is a cross sectional view taken along line 2—2 of a preferred embodiment of door module with an integrated window regulator showing an I-shaped bracket in accordance with the preferred embodiment of FIG. 1, a preferred embodiment of a seal assembly forming a seal between the door frame and the windowpane and between the door frame and the motor vehicle, and also showing the windowpane positioned generally flush with an exterior surface of a motor vehicle.
Figure 7:
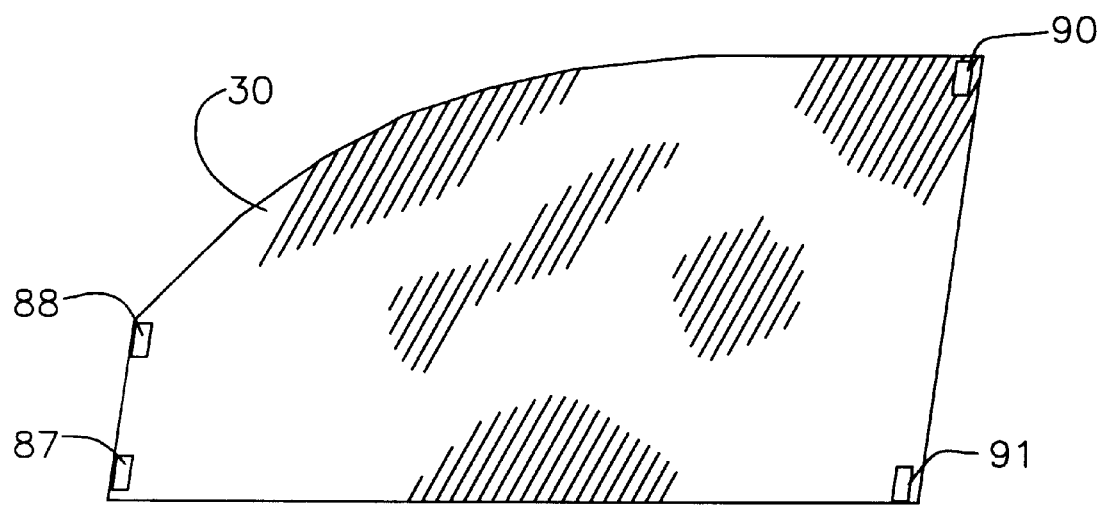
FIG. 7 is a view of the bracket assembly attached near the corners of the windowpane in accordance with a preferred embodiment.
Figure 8:
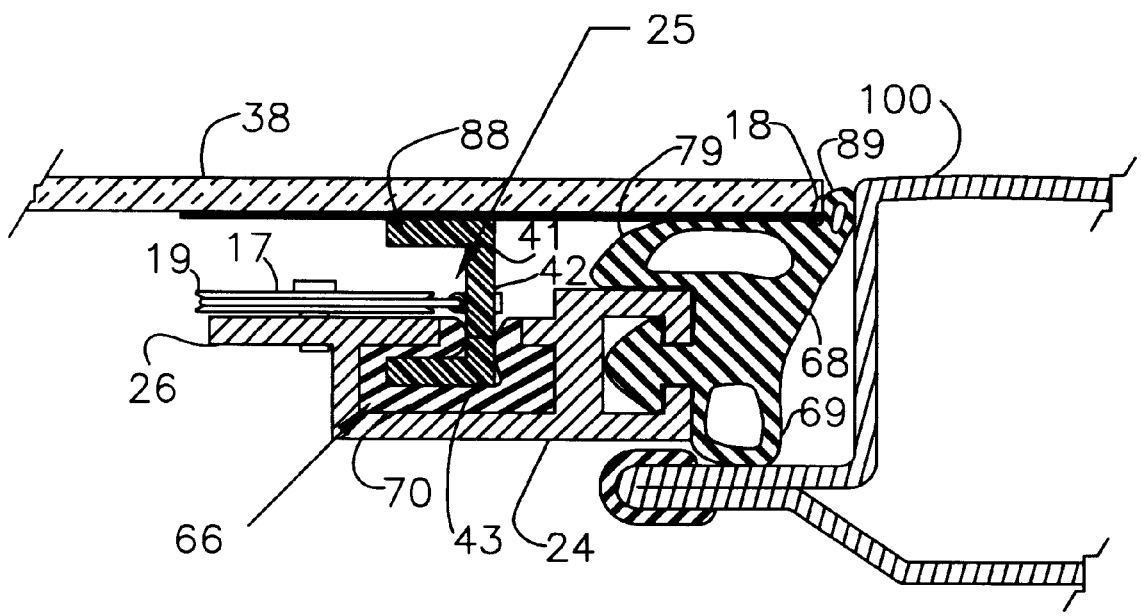
FIG. 8 is a cross sectional view similar to FIG. 2 of an alternative preferred embodiment where a C-shaped bracket is slidably received by the run channels.

FIG. 2 shows one preferred embodiment of the mounting bracket assembly comprising bracket 40 and structural door frame 24 interface on the aft interior side of the windowpane. A similar bracket may be used on the fore or front interior edge of the windowpane. The bracket 40 may be I-shaped, having a first flange 41 attached to the windowpane, preferably by one sided adhesive bonding so as to eliminate holes through the drop glass windowpane, a second flange 42 extending away from the first flange into run channel 66 defined by door frame 24 through opening 25, connected to a run channel flange 43. The brackets may be made of metal or plastic, or other suitably rigid material. Optionally the brackets may be hidden from exterior or outboard view by a darkened coating or flit 18 positioned on the fore and aft edges of windowpane 30. Pulleys 19 are attached to flange 26 of the structural door frame 24, and the cable 17 is attached to the bracket 40. Run channel guide seals 70 help prevent rattling and other noises as the brackets slide up and down in the door frame run channels. FIG. 7 shows the windowpane and a preferred embodiment of the bracket assembly, comprising four C-shaped brackets 87, 88, 90, 91 positioned near the "corners" of the windowpane, each bonded to an interior side of the windowpane. Together the windowpane and brackets act as a gliding element, sliding up and down in the run channels defined by the elongate fore and aft door frames. Moreover, use of such an embodiment wherein all hardware is bonded to one side of the windowpane allows for an exterior surface of the windowpane to be positioned generally flush with an exterior surface of the motor vehicle, a feature that is highly desirable for exterior styling.

Figure 4:
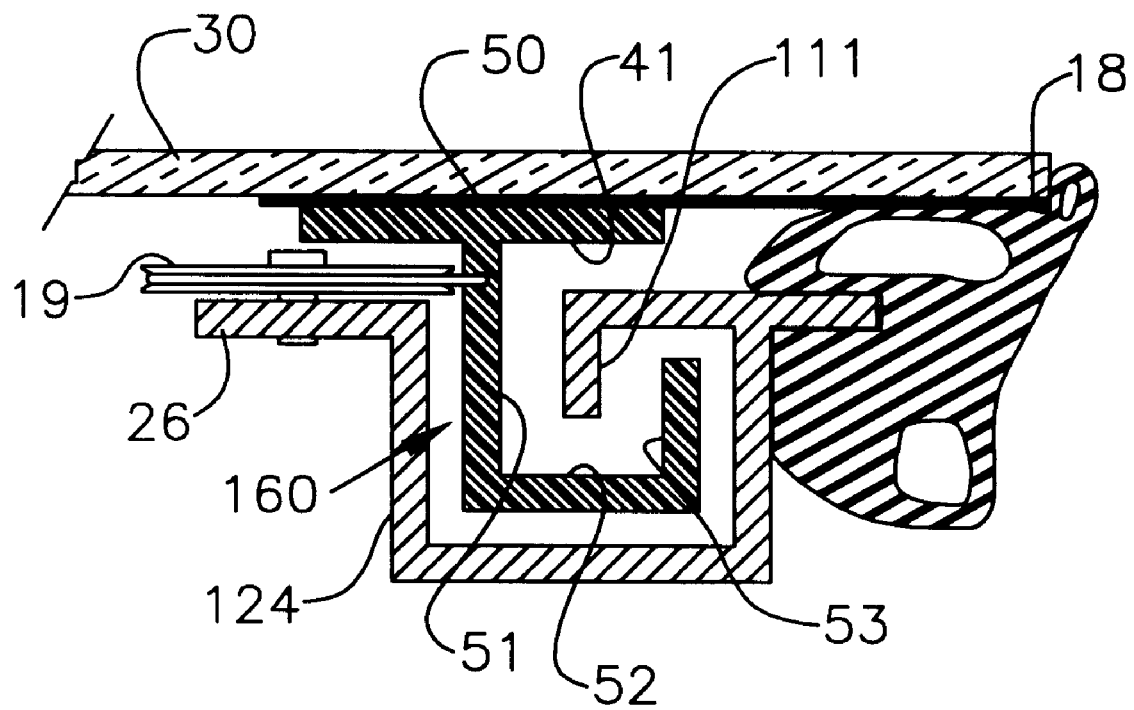
FIG. 4 is a cross sectional view of an alternative preferred embodiment of a flush mounted door module showing a J-shaped mounting bracket with the glass run channel seals removed for clarity of illustration.
Figure 5:
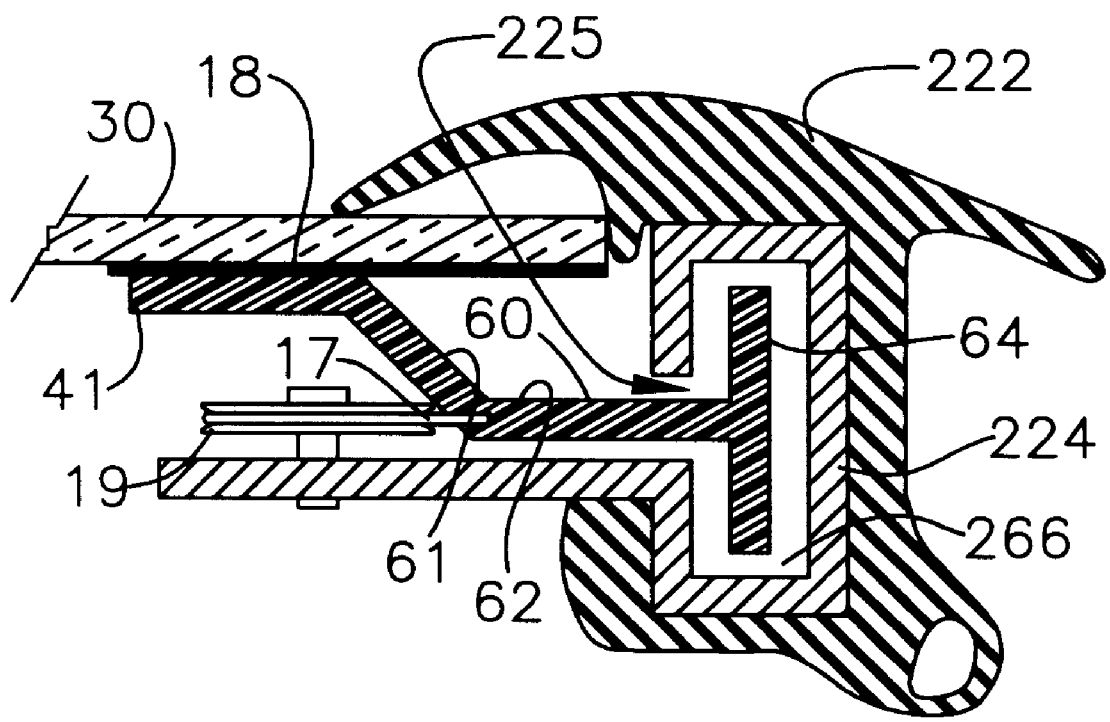
FIG. 5 is a cross sectional view of an alternative preferred embodiment showing a window regulator having a T-shaped mounting bracket, with the run channel seals removed for clarity of illustration.

FIGS. 4 & 5 show alternative preferred embodiments of the bracket/door frame interface with the run channel guide seal removed for clarity of illustration. In FIG. 4, the elongate bracket 50 is J-shaped, and has a series of flanges 51, 52, 53 each of which are bent at right angles to the previous flange to form the "J". The corresponding structural door frame 124 has a flange 111 extending into the run channel 160 that cooperates with the brackets to guide the windowpane in its travel path. In FIG. 5, the bracket assembly has a bracket 60 which is seen to have a generally T-shaped portion comprising flanges 60, 62, 64. Flange 64 slides in run channel 266. The aft door frame opening 225 faces generally towards its corresponding fore door frame opening, that is, it opens in a plane generally parallel to the windowpane generally towards the other frame opening. Seal 222 wraps around windowpane 30 and structural door frame 224. Other bracket designs, such as, for example, bracket assemblies attached to one side of the windowpane to produce a flush door module and/or brackets having a C-shape cross section, and corresponding structural door frame designs will be apparent to those skilled in the art given the benefit of this disclosure.

Seal assembly 68 is attached to the elongate door frames, either as one continuous piece running along from the fore door frame 22 to the header 23 and back down the aft door frame 24, or as separate segments. The seal assembly minimizes noises as the windowpane cycles up and down and when the windowpane moves into the closed position, the seal also prevents exterior elements such as rain, dirt, etc., from entering into the interior of the motor vehicle. In certain preferred embodiments the seal assembly forms a seal between the elongate door frames and the windowpane, such as bulb seal 79 in FIG. 2, and may also form a seal between the door frame and the body 100 of the motor vehicle 10, such as bulb seal 69. Most preferably, the seal between the door frame and the windowpane and the seal between the door frame and the motor vehicle body are unitary with one another, such that the seal assembly is a one-piece construction. Seal 89 of seal assembly 68 may optionally be positioned between the windowpane 30 and the motor vehicle body 100. Other seal assemblies will be apparent to those skilled in the art given the benefit of this disclosure.

Figure 6:
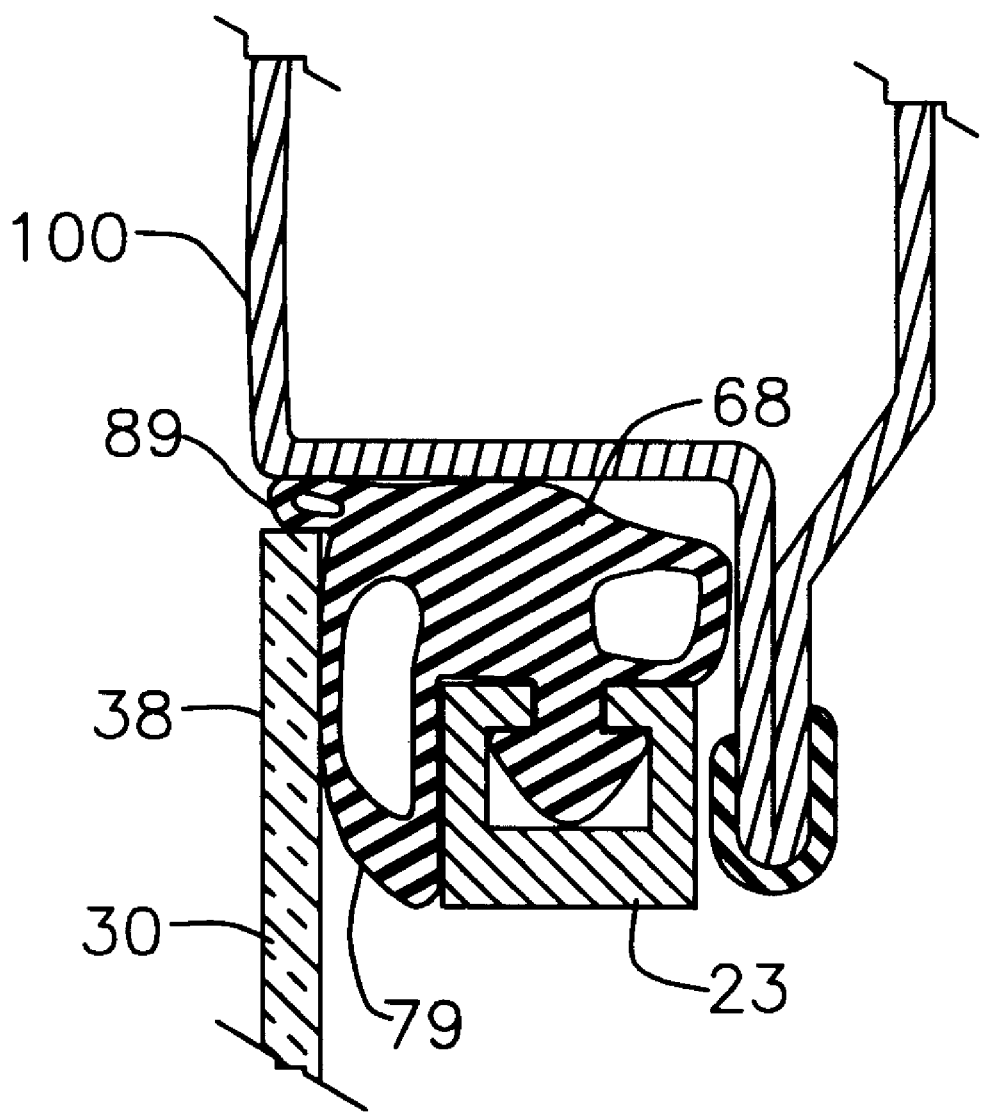
FIG. 6 is a cross sectional view of a header section of the door frame assembly, showing the windowpane positioned generally flush with the exterior surface of the motor vehicle in accordance with a preferred embodiment.

Optionally the windowpane may be positioned generally flush with the exterior surface of the motor vehicle body 100, as shown in FIGS. 2 and 6. More specifically, the windowpane 30 has an exterior surface 38 that can in certain preferred embodiments be aligned with the exterior surface 100 of the vehicle. FIG. 6 shows the header 23 where the windowpane has exterior surface 38 positioned generally flush with the exterior surface of the motor vehicle body 100. The windowpane is said to be flush on three sides with the motor vehicle when the exterior surface of the windowpane is generally parallel with the exterior surface of the motor vehicle at the top, fore and aft sides of the windowpane. A three sided flush windowpane is a highly advantageous configuration for exterior styling of motor vehicles.

Figure 3:
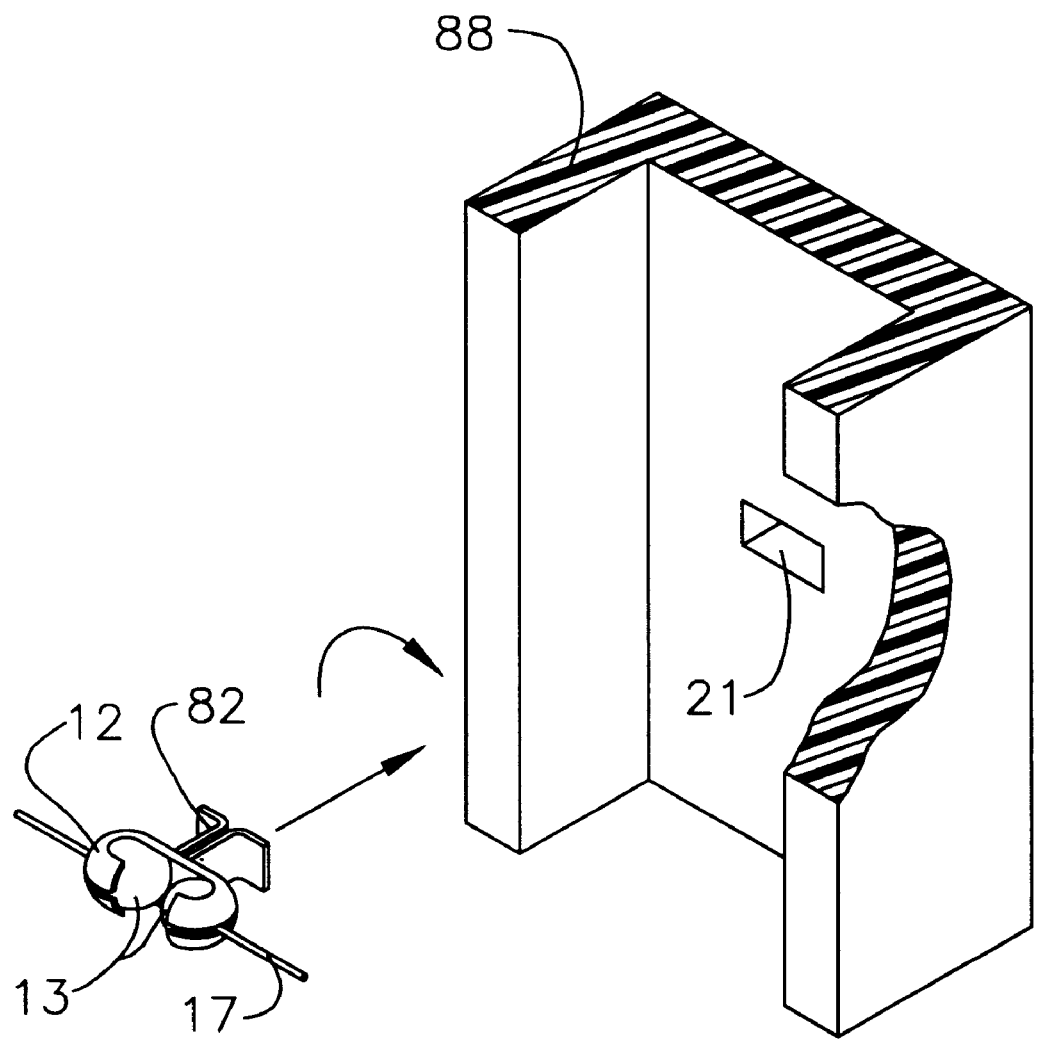
FIG. 3 is an exploded perspective view, of a bracket, ball carrier and attachment mechanism for a cable in accordance with a preferred embodiment.

FIG. 3 shows a highly advantageous feature in accordance with a preferred embodiment which allows for easy attachment of the cable to the mounting brackets. Here, the mounting bracket 88 is C-shaped, and provided with a slot 21. The cables 17 have cable end balls 13 which are preferably snugly cupped in an endball carrier 12. Snugly, as used here, refers to a tight fit so as to restrict relative motion between the balls and the carrier. The endball carrier 12 has a flange or flanges 82 which are insertable into the slot 21. Preferably the flanges may be inserted by snap fit into the slot when the cables are loose, and then rotated into final position as the cables are pulled to a taut position. Snap fit here means the resiliency of the part allows for a positive lock after fitting through or sliding past a restrictive aperture. Other cable-bracket attachment mechanisms will be apparent to those skilled in the art given the benefit of this disclosure.

From the foregoing disclosure and detailed description of certain preferred embodiments, it will be apparent that various modifications, additions and other alternative embodiments are possible without departing from the true scope and spirit of the invention. For example, an arm and sector regulator may be used with the seal assembly on a three-sided flush window module, or alternatively a cable edge drive window regulator design can be used, where the cable is routed along the window frame and the bottom of the door module. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A door module for a door of a motor vehicle comprising, in combination:
   a slidable windowpane;
   drive means for moving the windowpane between an open position and a closed position;
   a bracket assembly comprising at least a first pair of fore and aft brackets, said fore bracket fixedly attached to the windowpane adjacent to a corresponding fore edge of the windowpane and said aft bracket fixedly attached to the windowpane adjacent to a corresponding aft edge of the windowpane;
   a cable assembly comprising a cable connecting the drive means to the fore and aft brackets and transmitting a force of said drive means to the fore and aft brackets to move the windowpane;
   cable routing means for routing the cable between the drive means and the fore and aft brackets;
   a door frame assembly having fore and aft elongate door frames connected by a header door frame, the door frames cooperating to form an opening closed by the windowpane when the windowpane is in the closed position, wherein the fore and aft brackets are slidably disposed within the fore and aft elongate door frames, respectively, the cable routing means is attached to the fore and aft elongate door frames; and
   a seal assembly attached to the door frame assembly, forming a seal between the elongate door frames and the slidable windowpane.

2. The door module of claim 1 wherein the fore door frame has a cable routing flange and the aft door frame has a cable routing flange, and the cable routing means is attached to each of said cable routing flanges.

3. The door module of claim 1 wherein each of the fore and aft door frames has a run channel provided with a run channel opening, and the run channels slidably receive the fore and aft brackets of the bracket assembly.

4. The door module of claim 3 wherein each run channel opening faces the windowpane.

5. The door module of claim 3 wherein each one of the fore and aft brackets has an I-shaped cross section.

6. The door module of claim 3 wherein each bracket is attached to an inboard side of the windowpane.

7. The door module of claim 3 wherein a portion of each one of the fore and aft brackets has a C-shaped cross section.

8. The door module of claim 3 wherein the run channel openings face one another.

9. The door module of claim 3 wherein a portion of each one of the fore and aft brackets has a J-shaped cross section.

10. The door module of claim 3 wherein a portion of each one of the fore and aft brackets has a T-shaped cross section.

11. The door module of claim 3 wherein the door frame assembly further comprises elongate run channel guide seals positioned in each run channel.

12. The door module of claim 1 wherein the bracket assembly further comprises a second pair of fore and aft brackets, the fore bracket of the second pair of fore and aft brackets is attached to the windowpane adjacent the fore edge of the windowpane and the aft bracket of the second pair of fore and aft brackets is attached to the windowpane adjacent the aft edge of the windowpane, with the first pair of fore and aft brackets attached to the windowpane near a top edge of the windowpane and the second pair of fore and aft brackets attached to the windowpane near a bottom edge of the windowpane, each of said fore and aft door frames including a run channel, the first and second pair of fore and aft brackets being slidably received in the run channels of the fore and aft door frames, respectively.

13. The door module of claim 1 wherein the seal assembly comprises unitary elastomeric first and second seal segments, the first seal segment adapted to form a seal between the elongate door frames and a body of the motor vehicle, and the second seal segment forming a seal between the windowpane and the elongate door frames.

14. The door module of claim 13 wherein the seal assembly further comprises a third elastomeric seal segment, unitary with the first and second seal segments, wherein the third seal segment is adapted to form a seal between the windowpane and the motor vehicle body.

15. The door module of claim 13 wherein the first and second seal segments are bulb seals.

16. The door module of claim 1 wherein the cable assembly further comprises a cable endball snugly cupped in an endball carrier and the bracket assembly has a slot which receives the endball carrier by snap fit.

17. A pre-assembled door module for attachment to an outer panel of a door for a motor vehicle comprising, in combination:
   an inner panel having a beltline;
   a structural door frame assembly having elongate fore and aft door frames connected by a header door frame, the door frames cooperating with the beltline to form an opening;
   a windowpane movable between an open position and a closed position in which the windowpane closes the opening;
   drive means for moving the windowpane;
   bracketry comprising a pair of fore brackets and a pair of aft brackets, the fore brackets being fixedly bonded to said windowpane only on one side of the windowpane adjacent to a fore peripheral edge of the windowpane and the aft brackets being fixedly bonded to said windowpane only on said one side of the windowpane adjacent to an aft peripheral edge of the windowpane, the brackets being slidably received by said fore and aft door frames, respectively;
   a cable assembly comprising a cable connecting the drive means to the fore and aft brackets and transmitting a force of said drive means to the fore and aft brackets to move the windowpane; and
   cable routing means attached to the fore and aft door frames for routing the cable assembly between the drive means and the fore and aft brackets.

18. The pre-assembled door module of claim 17 further comprising a seal assembly attached to the elongate door frames sealingly closing the opening when the windowpane is in the closed position.

19. The pre-assembled door module of claim 17 further comprising a non-transparent frit applied to at least the fore and aft peripheral edges of the windowpane.

20. The pre-assembled door module of claim 17 wherein the fore and aft door frames each comprise a unitary member extending substantially vertically from above the beltline to below the beltline.

21. A door for a motor vehicle having a body with an exterior surface, the door comprising, in combination:
   an outer panel; and
   a door module attached to the outer panel comprising:
      an inner panel cooperating with the outer panel to form an interior cavity, a windowpane-receiving entry to the interior cavity and a beltline at a top of the inner panel;

a structural door frame assembly comprising first and second door frames connected by a header, wherein the structural door frame assembly and the beltline define an opening;

a windowpane having fore and aft edges, an interior surface and an exterior surface, wherein the windowpane is movable between an open position and a closed position and is sized to close the opening in the closed position, wherein the first and second door frames slidably guide the windowpane;

a seal assembly attached to the door frames and adapted to form a seal between the door frames and the motor vehicle body and between the windowpane and the door frames;

drive means for moving the windowpane, attached to the inner panel;

bracketry comprising a pair of brackets one pair fixedly bonded to said windowpane only on the interior surface of the windowpane adjacent to a fore edge of the windowpane and the other fixedly bonded to the windowpane only on the interior surface of the windowpane adjacent an aft edge of the windowpane, the brackets being slidably received by the door frames; and a cross-cable assembly comprising a cable connecting the drive means to the brackets and transmitting a force of the drive means to the brackets to move the windowpane, a pair of cable guide elements mounted on the first door frame, and a pair of cable guide elements mounted on the second door frame, wherein the cable is routed in an X-shape between the four cable guide elements.

22. The door of claim 21 wherein the first and second door frames are aligned with the fore and aft edges of the windowpane.

23. The door of claim 21 wherein the windowpane is adapted to be positioned generally flush with the exterior surface of the motor vehicle.

24. A door module for a door of a motor vehicle comprising, in combination:

a windowpane having an interior surface and an exterior surface and peripheral top, fore and aft edges;

means for moving the windowpane between an open position and a closed position;

fore and aft brackets fixedly attached near said fore and aft edges, respectively, on only the interior surface of the windowpane;

a door frame assembly having fore and aft elongate door frames which slidably receive said fore and aft brackets, respectively, and a third elongate door frame connecting the fore and aft door frames to form an opening; and at least one of a pulley and a slider attached to the fore and aft elongate door frames, routing a cable between the fore and aft brackets and the means for moving the windowpane, the cable transmitting a force of said means for moving the windowpane to the fore and aft brackets to move the windowpane into the opening so as to close the opening.

25. The door module of claim 24 wherein the exterior surface of the windowpane is adapted to be positioned generally flush with an exterior surface of the motor vehicle.

26. A door module for a door of a motor vehicle comprising, in combination:

a slidable windowpane having an interior surface and an exterior surface;

drive means for moving the windowpane between an open position and a closed position in which the windowpane closes an opening;

bracketry comprising fore and aft brackets fixedly attached to said windowpane only on one side of said windowpane adjacent to corresponding fore and aft edges of the windowpane;

a cable assembly comprising a cable connecting the drive means to the fore and aft brackets and transmitting a force of said drive means to the fore and aft brackets to move the windowpane;

cable routing means for routing the cable between the drive means and the brackets;

a door frame assembly forming said opening and having fore and aft elongate door frames each comprising a vertically extending unitary frame member defining a run channel, each run channel slidably receiving one pair of the fore and aft brackets, wherein the cable routing means are attached to the unitary frame members; and a seal assembly attached to the door frame assembly, forming a seal between the vertically extending frame members and the slidable windowpane.

* * * * *